J. M. REDDY.
School-Room Heater.

No. 168,106. Patented Sept. 28, 1875.

WITNESSES:
J. P. Smith
Lyman Morgan

INVENTOR:
James M. Reddy

UNITED STATES PATENT OFFICE.

JAMES M. REDDY, OF MILWAUKEE, WISCONSIN.

IMPROVEMENT IN SCHOOL-ROOM HEATERS.

Specification forming part of Letters Patent No. 168,106, dated September 28, 1875; application filed March 17, 1875.

*To all whom it may concern:*

Be it known that I, JAMES M. REDDY, of Milwaukee, in the county of Milwaukee, in the State of Wisconsin, have invented certain Improvements in School-Room Heaters, of which the following is a specification:

My invention has for its object the heating of school-rooms and other places. It is heated with an air-opening in its bottom for the air to pass up and around the fire-pot to the top, and inside of the outer shell, where there is a water-reservoir, for the purpose of moistening the air, and a register-opening at the top for the heated air to escape from the heater.

Figure 1:
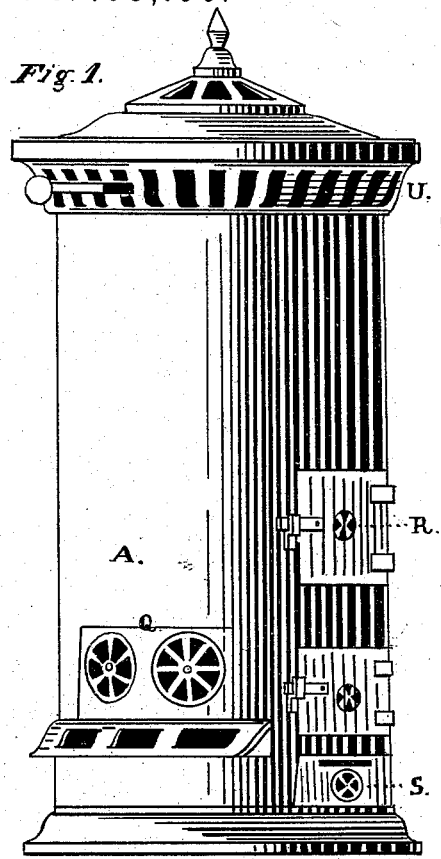
Figure 2:
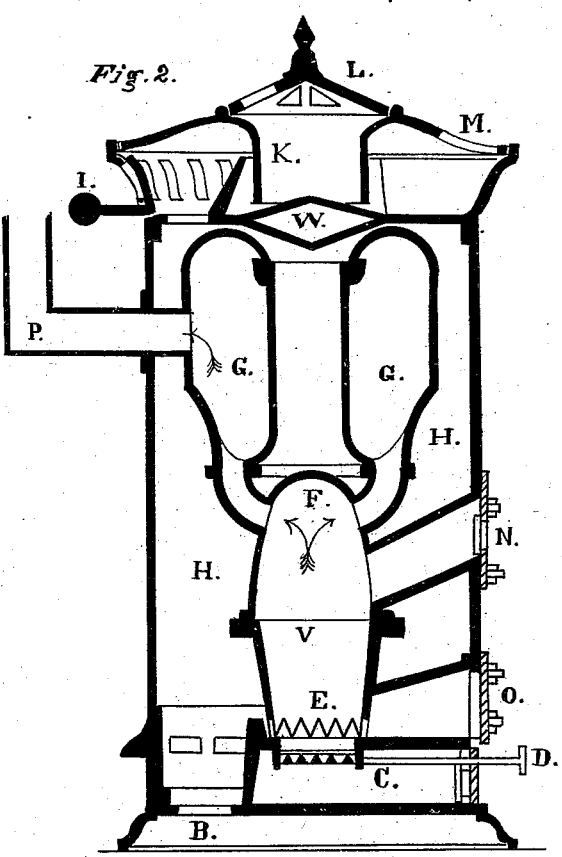
Figure 3:
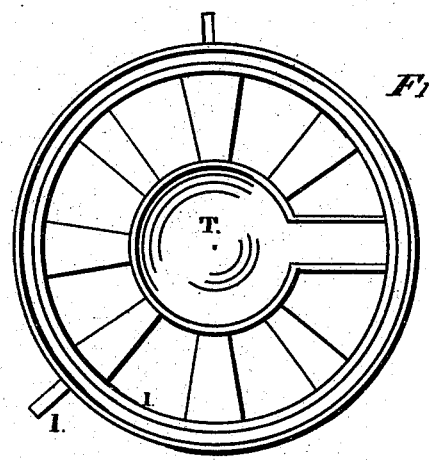

Figure 1 is an isometrical view of my invention; Fig. 2, a vertical section of same, and Fig. 3 a view of the hot-air register and evaporizing-pan.

A is the outside shell of the heater; B, the opening in the bottom for the inlet of air; C, the ash-pan; D, the grate and grate-shaker; E, a crimped rim round the inside of the bottom of the fire-pot and above the grate; F, the fire-dome; G, smoke and heat room; H, air-space inside the shell A; I, a handle to open and close the air-registers; K, top of the heater, which projects downward in its center within about an inch of the bottom of the evaporizing-pan; L, cover on the top of K, with openings in it; M, opening in the top for the supply of water; N, door for feeding in fuel to the fire; O, anti-clinker door; P, smoke-pipe; Q, isinglass in the side of shell A; R, isinglass in the door N; T, an evaporating-pan in the top of the heater; U, the registers round the top of the heater; V, fire-pot; W, a double bottom of the evaporating-pan, forming an air-space between the two, and throwing the heat to the outside of the pan.

The operation of this heater is as follows: Set it in a school-room, or any other place, over an opening in the floor, for the air to pass up into it, and attach the pipe P from the heater to the chimney; fill the evaporating-pan with water; then build a fire in the fire-pot, and the heat will rarefy the air in space H, and it will rise and pass round the water-reservoir, and the steam rising from the water will mix with the air and moisten the same, and then pass out through the registers U, and heat the room.

I claim as my invention—

1. Evaporating-pan T, with a double bottom, W, register U, and top K, all in combination substantially as set forth.

2. A heater with evaporating-pan T, with bottom W, top K, and cover L, all in combination substantially as described.

JAMES M. REDDY.

Witnesses:
 J. B. SMITH,
 LYMAN MORGAN.